United States Patent
Michimoto et al.

(10) Patent No.: US 7,185,324 B2
(45) Date of Patent: Feb. 27, 2007

(54) COMPILER APPARATUS AND METHOD FOR DETERMINING LOCATIONS FOR DATA IN MEMORY AREA

(75) Inventors: Shohei Michimoto, Takatsuki (JP); Hajime Ogawa, Suita (JP); Toshiyuki Sakata, Osaka (JP); Taketo Heishi, Osaka (JP); Shuichi Takayama, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 582 days.

(21) Appl. No.: 10/631,960

(22) Filed: Aug. 1, 2003

(65) Prior Publication Data

US 2004/0172624 A1 Sep. 2, 2004

(30) Foreign Application Priority Data

Aug. 1, 2002 (JP) ............................. 2002-225286

(51) Int. Cl.
*G06F 9/45* (2006.01)
*G06F 12/00* (2006.01)
*G06F 12/02* (2006.01)

(52) U.S. Cl. ..................... 717/140; 717/151; 711/170; 711/212

(58) Field of Classification Search ................... None
See application file for complete search history.

(56) References Cited

U.S. PATENT DOCUMENTS

| | | | | | |
|---|---|---|---|---|---|
| 5,586,323 | A | * | 12/1996 | Koizumi et al. | 717/174 |
| 2003/0126399 | A1 | * | 7/2003 | Troutman et al | 711/212 |
| 2004/0153589 | A1 | * | 8/2004 | Nishioka | 710/52 |

* cited by examiner

*Primary Examiner*—Antony Nguyen-Ba
(74) *Attorney, Agent, or Firm*—McDermott Will & Emery LLP

(57) ABSTRACT

Disclosed is a compiler apparatus for generating an instruction code composed of instruction sets each including an instruction that designates an m-bit immediate value indicating a location of a data item in a memory area. The compiler apparatus sequentially selects, based on one data attribute, a data item from a group X composed of a plurality of data items; and judges, each time a data item is selected, whether the selected data item is allocatable to an n-byte memory area ($n \leq 2^m$). When the judgment is negative, the compiler apparatus specifies, based on a different data attribute, a data item out of all the selected data items and excludes the specified data item from the group X, and repeats the selection until all the data items remaining in the group X after excluding specified data items are judged to be allocatable to the memory area.

10 Claims, 16 Drawing Sheets

FIG.2

```
       void dummy1(char);
       void dummy2(int);
       void dummy3(char*);
       void dummy4(double*);

100    void
101    f(void)
102    {
          .
          .
          .
110       char a;
111       int b;
112       char c[19];
113       double d[4];
          .
          .
          .
140       dummy1(a);
141       dummy2(b);
142       dummy3(c);
143       dummy4(d);
          .
          .
          .
199       return;
200    }
```

FIG.4

| TYPE | VARIABLE NAME | SIZE | ALIGNMENT |
|---|---|---|---|
| char | a | 1 | 1 |
| int | b | 4 | 4 |
| char[ ] | c | 19 | 1 |
| double[ ] | d | 32 | 8 |

FIG.9

210     ld1  r0,(sp,23)  //ACCESS TO a 220     ld4  r0,(sp,0)   //ACCESS TO b 230     ld1  r0,(sp,4)   //ACCESS TO c 240     ld8  r0,(sp,24)  //ACCESS TO d

FIG.10

310    ld1  r0,(sp,0)   //ACCESS TO a
         .
         .
         .
320    ld4  r0,(sp,4)   //ACCESS TO b
         .
         .
         .
330    ld1  r0,(sp,8)   //ACCESS TO c
         .
         .
         .
340    mov r1,32        //ACCESS TO d
350    ld8  r0,(r1)     //ACCESS TO d
         .
         .
         .

FIG.11

| | | |
|---|---|---|
| 410 | mov r1,55 | //ACCESS TO a |
| 420 | ld1 r0,(r1) | //ACCESS TO a |
| | . | |
| | . | |
| | . | |
| 430 | mov r1,32 | //ACCESS TO b |
| 440 | ld4 r0,(r1) | //ACCESS TO b |
| | . | |
| | . | |
| | . | |
| 450 | mov r1,36 | //ACCESS TO c |
| 460 | ld1 r0,(r1) | //ACCESS TO c |
| | . | |
| | . | |
| | . | |
| 470 | ld8 r0,(sp,0) | //ACCESS TO d |
| | . | |
| | . | |
| | . | |

| TYPE | VARIABLE NAME | SIZE | ALIGNMENT | REFERENCE FREQUENCY |
|---|---|---|---|---|
| char | a | 1 | 1 | 5 |
| int | b | 4 | 4 | 45 |
| char[ ] | c | 19 | 1 | 7 |
| double[ ] | d | 32 | 8 | 4 |

COMPILER APPARATUS AND METHOD FOR DETERMINING LOCATIONS FOR DATA IN MEMORY AREA

This application is based on an application No. 2002-225286 filed in Japan, the content of which is hereby incorporated by reference.

BACKGROUND OF THE INVENTION (1) Field of the Invention

The present invention relates to a compiler that translates a source program into an object program, i.e. a machine code program. More particularly, the present invention relates to a compiler apparatus and a method used by a compiler apparatus to determine locations for variables in a memory area.

(2) Description of the Related Art

With the recent trend for larger-scale software, it becomes common to write software in high-level languages, such as C and C++, which are suitable for developing a larger-scale system.

Before loaded onto memory and executed, source programs written in a high-level language need to be translated into machine language codes by compilers dedicated for each source language so as to be directly executable by a CPU. A program loaded to memory includes, sets each composed of a code representing an instruction and a data item representing a variable. Each instruction represented by a code is executed by referencing a corresponding data item.

Here, there are two types of variables represented by data items. One is a global variable for which memory area is reserved at all times throughout run-time of the program, and the other is an automatic variable for which memory area (stack area) is reserved at the time when a predetermined function is called. Hereinafter, an "automatic variable" is simply referred to as a "variable".

A compiler determines locations in a stack area for each variable that corresponds to a predetermined function. FIG. 12 is a flowchart of location determination processing according to a conventional scheme 1 performed by a compiler to determine locations in a stack area for storing variables.

First, the compiler reads a source program (step S1), and performs parsing of the construction of sentences constituting the read program (step S2), and generates a variable correspondence table that contains variables to be allocated to the stack area (step S3).

Here, the variable correspondence table shows, for each variable contained, its variable type, variable name, data size, and alignment. Note that a "data size" is hereinafter referred to simply as a "size".

"Alignment" is a value predetermined according to each variable type and shows the strength of a constraint on a location in a stack area to which a corresponding variable is permitted to be allocated. For example, a variable having alignment "2" must be allocated to a location in a stack area whose address is a multiple of 2, and a variable having alignment "4" must be allocated to a location in a stack area whose address is a multiple of 4.

FIG. 4 is a view showing an example of the variable correspondence table. In the example shown in FIG. 4, the variable correspondence table contains four variable types (char, int, char[ ], and double [ ]) and shows corresponding variable names, sizes, and alignment values.

The compiler regards variables contained in the variable correspondence table as a target-variable set to be allocated to the stack area (step S4). The compiler selects from the target-variable set, a smallest-size variable, and determines a location in the stack area for the selected variable (step S5). The compiler then judges whether all of the variables in the target-variable set have been determined their locations in the stack area (step S6).

When judging that locations have been determined for all of the variables (step S6: Y), the compiler terminates the processing. On the other hand, when judging that any of the variables has not yet been determined its location (step S6: N), the compiler goes back to the step S5.

For example, when the variables contained in the variable correspondence table shown in FIG. 4 constitute a target-variable set, the compiler determines to allocate each variable to a location in a stack area as shown in a schematic diagram of FIG. 13. In FIG. 13, each-variable is determined to be allocated in the stack area in the ascending order of size (in the order of a, b, c and then d).

Here, each cell in FIG. 13 can store a one-byte variable. The first cell on the top left is assigned an address 0, the cell that is immediately to the right of the first cell is assigned an address 1, the cell that is immediately to the right of the second cell is assigned an address 2, and the cell that is immediately below the first cell is assigned an address 8. Note that the same description applies to later-described schematic diagrams showing locations of variables.

In FIG. 13, the spaces remaining unused in the stack area are where no variables are allocated due to the alignment constraints. To be more specific, the alignment of the variable b is 4. Consequently, the compiler is prohibited from allocating the variable b to a location at the address 1, i.e. immediately next to the variable a, and thus allocates the variable b to a location at the address 4. Similarly, the variable d is allocated to a location at the address 16.

With this memory allocation, when a variable stored within, for example, the first 32 bytes of the stack area is accessible with a single instruction, three are three different type variables each of which is accessible with a single instruction.

As described above, when variables are determined to be allocated in a stack area in the ascending order of size, a faster processing speed is achieved especially in the case of a program in which small-sized variables are frequently referenced.

Further, there is a conventional scheme 2 which determines to allocate variables to a stack area in the descending order of alignment.

FIG. 14 is a flowchart of location determination processing according to the conventional scheme 2 performed by a compiler to determine locations of variables in a stack area.

The compiler reads a source program (step S11); performs parsing of the construction of sentences constituting the read program (step S12); generates, based on the result of parsing, a variable correspondence table that contains variables to be allocated to the stack area (step S13); regards variables in the variable correspondence table as a target-variable set to be allocated to the stack area (step S14); selects, from the target-variable set, a variable having a largest alignment value and determines a location in the stack area for the selected variable (step S15); and judges whether all of the variables in the target-variable set have been determined their locations in the stack area (step S16).

When judging that locations have been determined for all of the variables (step S16: Y), the compiler terminates the processing. On the other hand, when judging that any of the variables has not yet been determined its location (step S16: N), the compiler goes back to the step S15.

For example, when the variables contained in the variable correspondence table shown in FIG. 4 constitute a target-variable set, the compiler determines to allocate each variable to a location in the stack area as shown in a schematic diagram shown in FIG. 15. In FIG. 15, each variable is determined to be allocated in the stack area in the descending order of alignment (in the order of d, b, c and then a (the order of c and a may be reversed)).

As shown in FIG. 15, according to this scheme, the compiler manages to allocate the variables in the stack area without leaving a unused space between adjacent variables.

As described above, memory allocation in the descending order of alignment minimizes a wasted, unused memory, and thus variables are effectively stored in a smaller capacity stack area.

Unfortunately, however, both conventional schemas have the following problems. Memory allocation according to the conventional scheme 1 inevitably results in that some of the stack area remains unused and thus wasted. As a result, a greater memory capacity is required.

Memory allocation according to the conventional scheme 2 tends to allocate a large-size variable at the top of the stack area, and thus fewer variables are accessible with a single instruction. This leads to decrease processing speed especially in the case of a program in which variables having smaller alignment are frequently referenced.

SUMMARY OF THE INVENTION

In view of the above problems, an object of the present invention is to provide a compiler apparatus and a method for optimally determining locations of variables in a stack area.

To achieve the object stated above, (1) one aspect of the present invention provides a compiler apparatus for クレーム.

(2) Here, the allocation data selecting unit may ・・・クレーム 4.

(3) Further, another aspect of the present invention provides クレーム 9.

(4) Here, the allocation data selecting step may ・・・クレーム 12.

(5) Further, yet another aspect of the present invention provides クレーム 15.

(6) Here, the allocation data selecting step may・・・クレーム 18.

(7) Further, yet another aspect of the present invention provides クレーム 21.

(8) Here, the allocation data selecting step may ・・・クレーム 24.

With the constructions stated above, locations for storing data items are optimally determined so that data items are allocated in a memory area of a predetermined size.

Further, in the construction (1) stated above, the first criterion may・・・クレーム 2.

Further, in the construction (1) stated above, the compiler apparatus may・・・クレーム 3.

Further, in the construction (2) stated above, the first criterion may・・・クレーム 5.

Further, in the construction (3) stated above, the first criterion may・・・クレーム 10.

Further, in the construction (4) stated above, the first criterion may・・・クレーム 13.

Further, in the construction (5) stated above, the first criterion may・・・クレーム 16.

Further, in the construction (6) stated above, the first criterion may・・・クレーム 19.

Further, in the construction (7) stated above, the first criterion may・・・クレーム 22.

Further, in the construction (8) stated above, the first criterion may・・・クレーム 25.

With the constructions stated above, locations for storing data items are optimally determined in a manner that data items are allocated in a memory area of a predetermined size with a minimum memory space left unused and that as many data items as possible are accessed with a small number of instructions.

Further, in the construction (2) stated above, the first criterion may・・・クレーム 6.

Further, in the construction (1) stated above, the first criterion may・・・クレーム 7.

Here, the compiler may・・・クレーム 8.

Further, in the construction (3) stated above, the first criterion may・・・クレーム 10.

Further, in the construction (4) stated above, the first criterion may・・・クレーム 14.

Further, in the construction (5) stated above, the first criterion may・・・クレーム 16.

Further, in the construction (6) stated above, the first criterion may・・・クレーム 20.

Further, in the construction (7) stated above, the first criterion may・・・クレーム 22.

Further, in the construction (8) stated above, the first criterion may・・・クレーム 26.

With the constructions stated above, locations for storing data items are optimally determined in a manner that a plurality of data items is allocated in a memory area of a predetermined size with a minimum memory space left unused and in consideration of how frequently each data item is referenced. As a result, processing speed of the resulting object program improves.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is a view showing an example of a source program 205;

FIG. 4 is a view showing an example of a variable correspondence table;

FIG. 9 is a view showing an example of an object program when the variables a, b, c and d are allocated according to the location determination processing of the embodiment;

FIG. 10 is a view showing an example of an object program when the variables a, b, c and d are allocated according to a conventional scheme 1;

FIG. 11 is a view showing an example of an object program when the variables a, b, c and d are allocated according to a conventional scheme 2;

FIG. 16 is a view showing an example of a variable correspondence table that contains information relating to how frequently each variable is referenced.

DESCRIPTION OF THE PREFERRED EMBODIMENT

<Construction>

Figure 1:
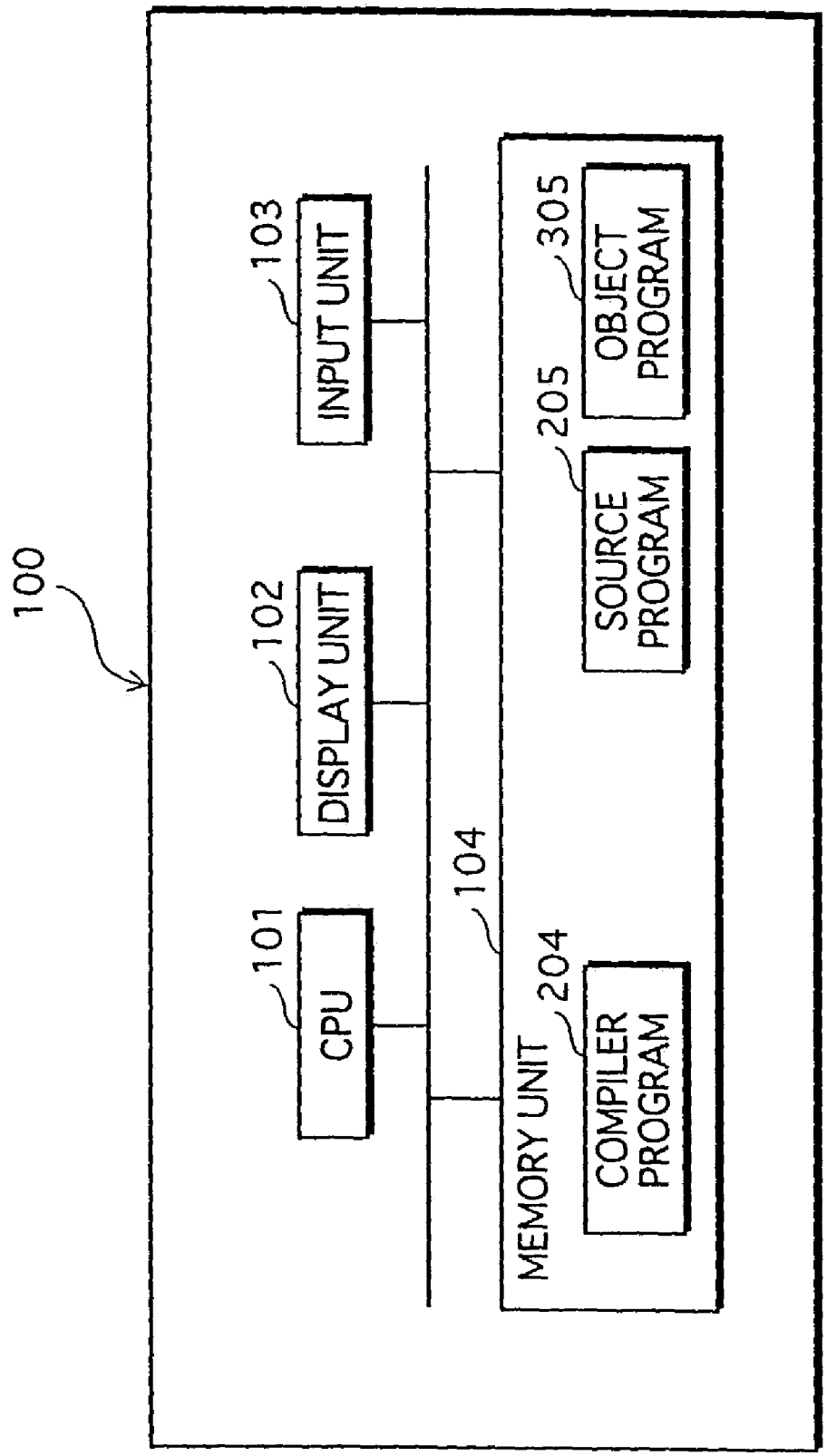
FIG. 1 is a view showing the construction of a compiler apparatus 100 of an embodiment according to the present invention.

FIG. 1 is a view showing the construction of a compiler apparatus 100 of an embodiment according to the present invention. The compiler apparatus 100 is composed of a CPU 101, a display unit 102, an input unit 103, and a memory unit 104.

In response to a user instruction inputted via the input unit 103, the CPU 101 executes a compiler program 204 stored in the memory unit 104 to compile a source program 205. In the compilation process, the CPU 101 determines locations in a stack area for storing variables included in the source program 205, and translates the source program 205 into an object program 305.

To be more specific, the CPU 101 reads the source program 205 from the memory unit 104, and performs parsing of the construction of sentences constituting the read source program 205, and determines locations in the stack area to allocate the variables based on the result of parsing, and then generates the object program 305.

Note that the location determination processing is described later in detail.

The display unit 102 displays the result of compilation conducted by the CPU 101.

The input unit 103 receives a user input instructing to execute the compilation.

The memory unit 104 stores therein the compiler program 204 and the source program 205. In addition, when the compilation is done, the memory unit 104 stores therein the object program 305 translated from the source program 205.

FIG. 2 is a view showing an example of the source program 205. Shown in FIG. 2 is a part of the source program 205. The statements numbered 102–200 define a function f (void), and the statements numbered 110–113 declare variables used in the function. When the CPU 101 executes the compilation, a variable correspondence table as shown in FIG. 4 is generated based on the declarative <Operations>

Figure 3:
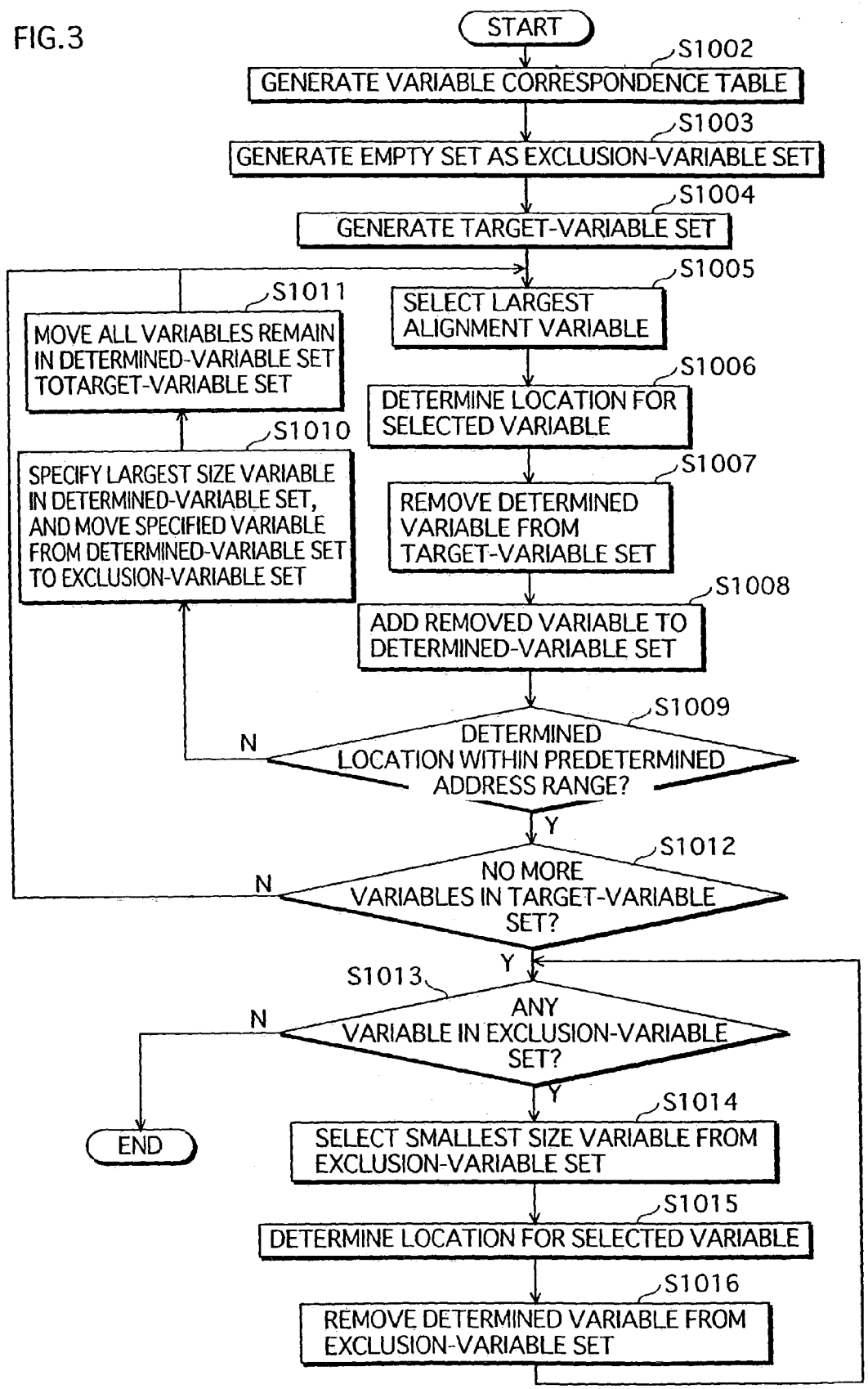
FIG. 3 is a flowchart showing location determination processing performed by a CPU 101 to determine locations of variables in a stack area.

Next, description is given to the location determination processing performed by the CPU 101 to determine locations of the variables in the stack area. FIG. 3 is a flowchart showing the location determination processing. Hereinafter, description is given with reference to the flowchart shown in FIG. 3.

First, the CPU 101 reads the source program 205 from the memory unit 104, and performs parsing of the construction of sentences constituting the read program. Based on the result of parsing, the CPU 101 generates a variable correspondence table (step S1002). In addition, the CPU 101 generates an empty set as an exclusion-variable set (step S1003), and a target-variable set composed of all the variables included in the variable correspondence table (step S1004) The CPU 101 then selects a variable having a largest alignment value from the target-variable set (step S1005), and determines for the selected variable a location in the stack area that (i) has not been determined as a location for any variable, (ii) satisfies the alignment constraint, and (iii) has a smallest possible address (step S1006). The CPU 101 removes from the target-variable set the variable for which location is determined (step S1007), and then adds the thus removed variable to a determined-variable set (step S1008) The CPU 101 then judges whether the address of the thus determined location is within a predetermined address range from the starting address of the stack area (step S1009).

When the address of the determined location is not within the predetermined address range (step S1009: N), the CPU 101 specifies a largest-size variable out of all the variables in the determined-variable set (when the determined-variable set includes only one variable, that variable is naturally specified) The CPU 101 removes the specified variable from the determined-variable set, and adds the thus removed variable to the exclusion-variable set (step S1010). Further, the CPU 101 puts all the variables remaining in the determined-variable set back to the target-variable set (step S1011). Thereafter, the CPU 101 repeats the steps S1005-S119 to newly determine locations for all the variables in the current target-variable set.

On the other hand, when the address of the location determined in the step S1006 is within the predetermined address range (step S1009: Y), the CPU 101 judges whether there is no more variable left in the target-variable set (step S1012).

When there is a variable left (step S1012: N), the CPU 101 returns to the step S1005.

When there is no variable left (step S1012: Y), on the other hand, the CPU 101 further judges whether there is any variable included in the exclusion-variable set (step S1013).

When there is a variable in the exclusion-variable set (step S1013: Y), the CPU 101 selects a smallest-size variable from the exclusion-variable set (step S1014). (Note that when the exclusion set includes only one variable, that variable is naturally selected.) The CPU 101 then determines for the thus selected variable a location in the stack area that (i) has not been determined as a location for any variable, (ii) satisfies the alignment constraint, and (iii) has a smallest possible address (step S1015). The CPU 101 removes, from the exclusion-variable set, the variable for which location is determined (step S1016), and goes back to the step S1013.

On the other hand, when there is no variable left in the exclusion set (step S1013: N), the CPU 101 terminates the processing.

Figure 5:
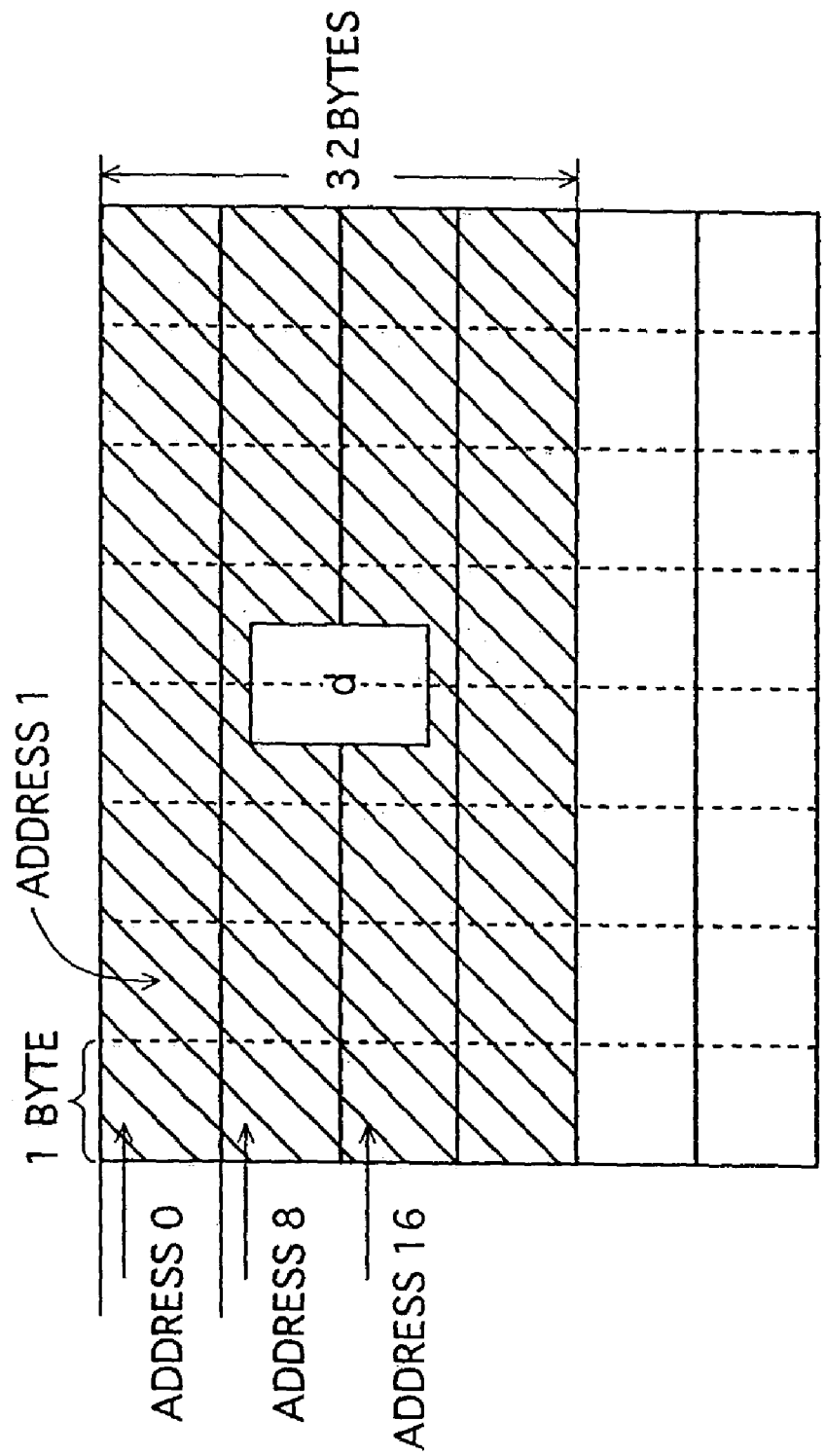
FIG. 5 is a schematic view showing the location of a variable d in the stack area.

Referring now to the example shown in FIG. 2, the above processing is specifically described. First, the CPU 101 reads from the memory unit 104 a source program which includes a series of sentences shown in FIG. 2, and performs parsing of the read source program. Based on the result of parsing, the CPU 101 generates the variable correspondence table shown in FIG. 4 (step S1002). The CPU 101 then generates a target-variable set composed of the variables a, b, c and d that are included in the variable correspondence table (step S1004). From the target-variable set, the CPU 101 selects the variable d as it has a largest alignment value (step S1005). The CPU 101 then determines to allocate the variable d to the location having the address 0 (step S1006). This is because the variable d with alignment 8 must be allocated to a location that (i) has not been determined as a location for any variable, (ii) satisfies the alignment constraint (a location whose address is a multiple of 8), and (iii) has a smallest possible address (in this example, each 1 byte of the stack area is sequentially assigned the address 0, 1, 2 . . . ). Next, the CPU 101 removes, the variable d from the target-variable set (step S1007), and adds the variable d to the determined-variable set (step S1008). The CPU 101 then judges whether the address of the determined location is within a predetermined address range from the starting address of the stack area. In this example, the predetermined address range is a 32-byte range of the address 0 to address 31 (step S1009). FIG. 5 is a schematic view showing the location of the variable d at this stage.

Since the location of the variable d begins at the address 0, the CPU 101 judges that the address of the determined location is within the predetermined address range (step S1009: Y), and further judges whether there is no more variable remains in the target-variable set (step S1012).

Figure 6:
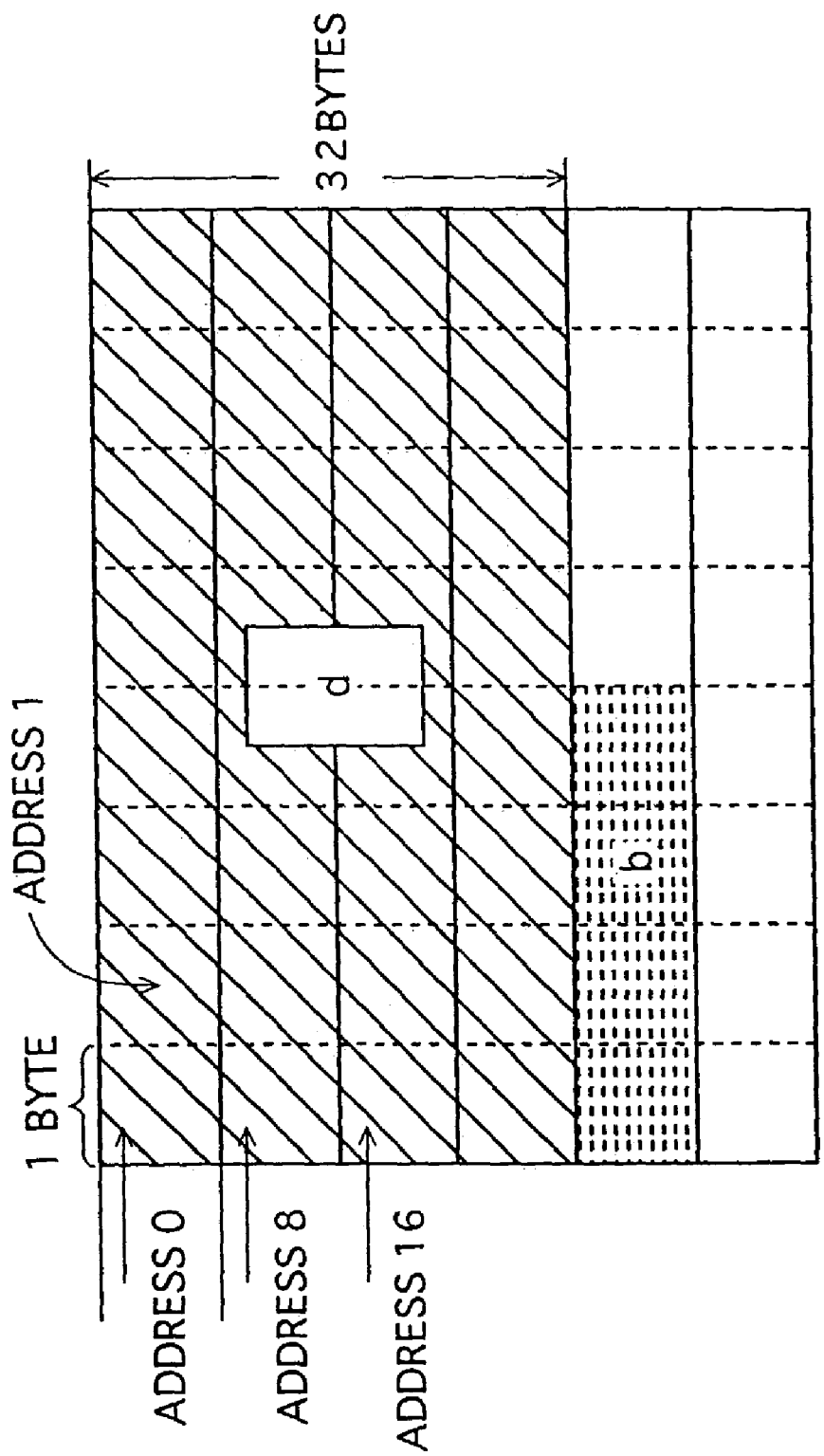
FIG. 6 is a schematic view showing the locations of variables d and b in the stack area.

Here, there are three variables a, b and c remaining in the target-variable set, so that the CPU 101 judges accordingly (step S1012: N), and selects the variable b having a largest alignment value in the target-variable set (step S1005). The CPU 101 then determines to allocate the variable b to a location in the stack area whose address begins at 32 (step S1006). This is because the variable b with the alignment 4 must be allocated to a location in the stack area that (i) has not been determined as a location for any variable, (ii) satisfies the alignment constraint, and (iii) has a smallest possible address. As shown in FIG. 5, the variable b has been already determined to be allocated in the stack area to occupy the location that begins at the address 0 and ends at the address 31. Thus, the variable b must be allocated to a location whose address is a multiple of 4 that is equal to 32 or greater. Next, the CPU 101 removes the variable b from the target-variable set (step S1007), adds the variable b to the determined-variable set (S1008), and judges whether the address of the determined location falls within the address range of the address 0 to the address 31 (step S1009). FIG. 6 is a schematic view showing the locations of the variables a and b in the stack area at this stage.

Since the location of the variable b begins at the address 32, the CPU 101 judges that the address of the determined location falls out of the predetermined address range (step S1009: N). The CPU 101 thus specifies the variable d that is a largest-size variable in the determined-variable set composed of the variables b and d, and then moves the specified variable d from the determined-variable set to the exclusion-variable set (step S1010). Next, the CPU 101 puts back to the target-variable set, all the variables remaining in the determined-variable set after removal of the specified variable d (step S1011). Thereafter, the CPU 101 repeats the steps S1005–S1009 and S1012 to newly determine locations in the stack area for the variables b, c and a sequentially (the order of the variables c and a may be reversed), and then the variables b, c and a are sequentially added to the determined-variable set.

Figure 7:
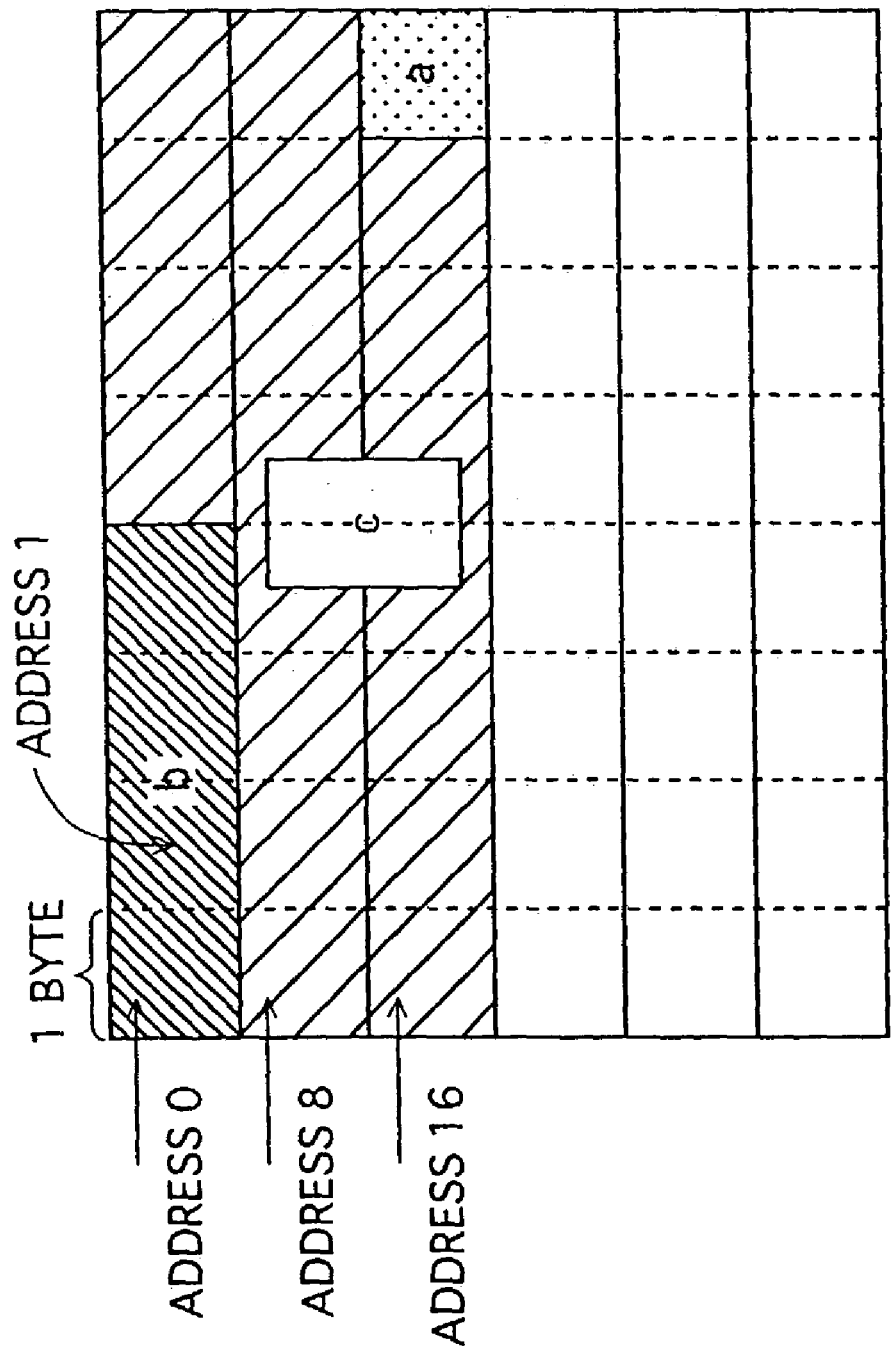
FIG. 7 is a view showing the locations of variables b, c and a in the stack area.

With the above processing, the variables b, c and a are determined to be allocated to locations in the stack area so as to fall within a range that begins at the address 0 and ends at the address 23, as shown in a schematic view of FIG. 7. Accordingly, the CPU 101 judges that each determined location is within the predetermined address range (step S1009: Y), and further judges that there is no more variable remains in the target-variable set (step S1012: Y). Since the variable d is now in the exclusion-variable set, the CPU 101 judges accordingly (step S1013: Y). The CPU 101 then selects the variable d that is a smallest-size variable in the exclusion-variable set (to be more specific, the variable d is the only member of the exclusion variable set in this example). The CPU 101 determines to allocate the variable d to the location whose address is 24 (step S1015). This is because the variable d having the alignment 8 needs to be allocated to a location in the stack area that (i) has not been determined as a location for any variable, (ii) satisfies the alignment constraint (a location whose address is a multiple of 8), and (iii) has a smallest possible address (a location whose address is equal to 24 or greater). Next, the CPU 101 removes the variable d from the exclusion-variable set (step S1016), judges that no more variable remains in the exclusion-variable set (step S1013: N), and terminates the location determination processing.

Figure 8:
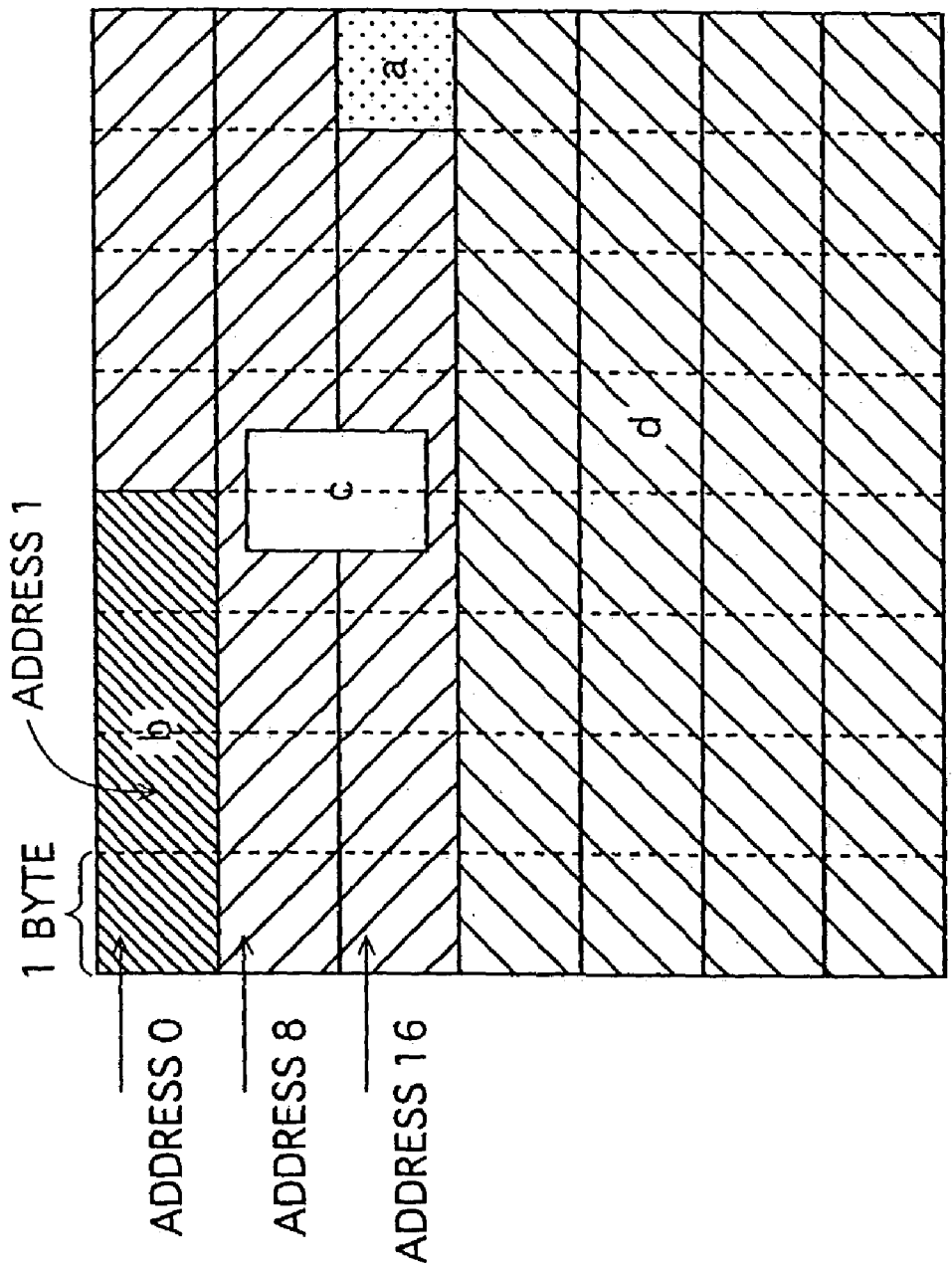
FIG. 8 is a view showing the locations of variables a, b, c and d in the stack area.
Figure 12:
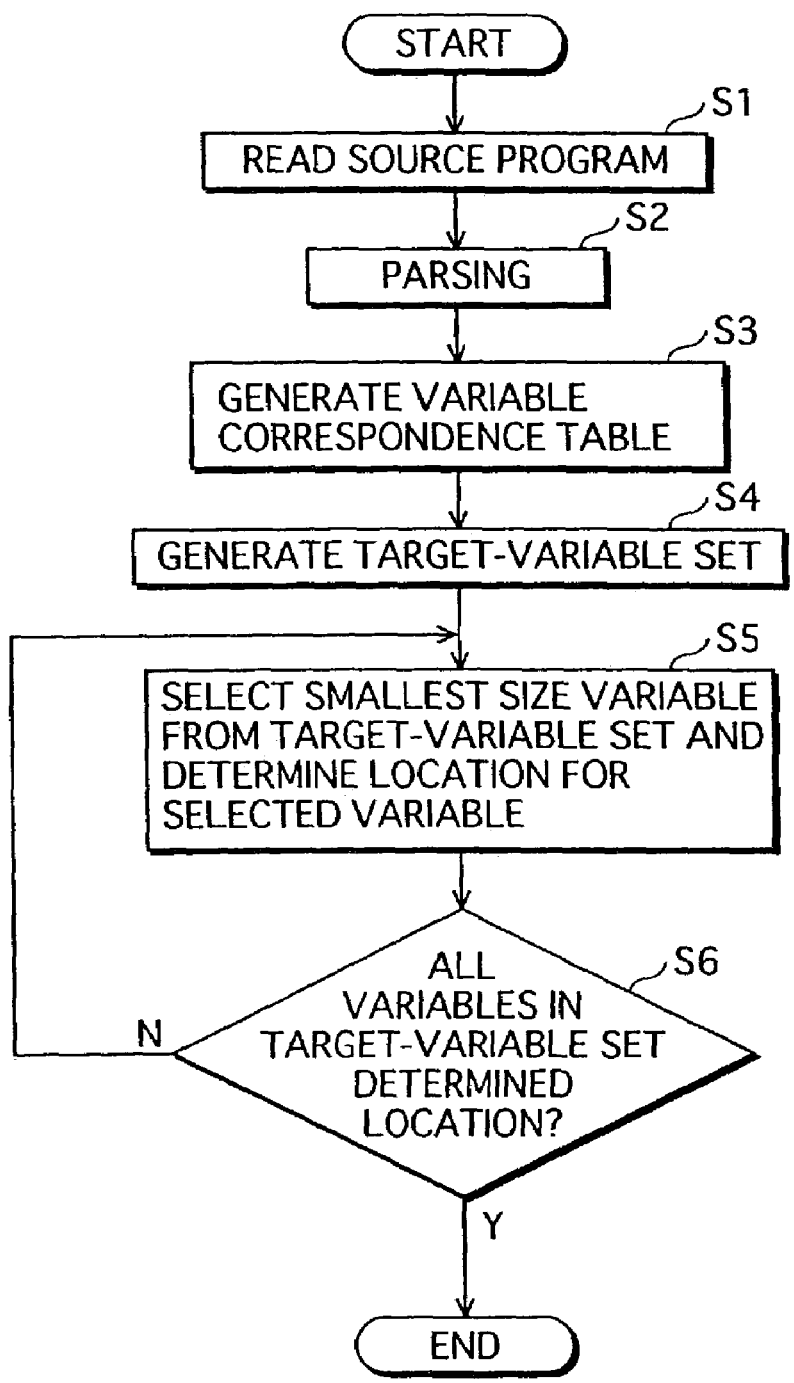
FIG. 12 is a flowchart showing location determination processing according to the conventional scheme 1 performed by a compiler to allocate the variables to a stack area.
Figure 13:
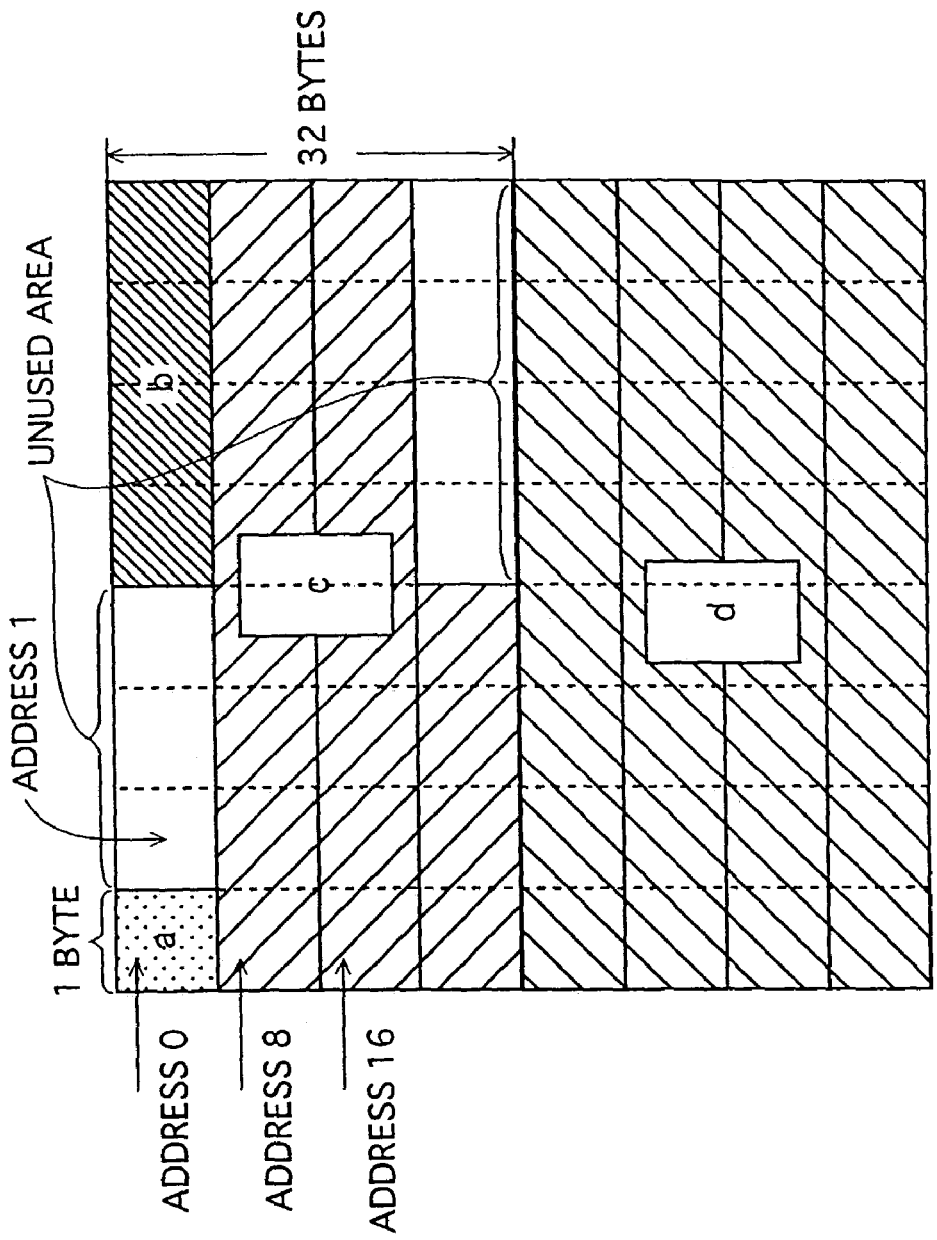
FIG. 13 is a schematic view showing the locations of the variables a, b, c and d in the stack area allocated according to the conventional scheme 1.
Figure 14:
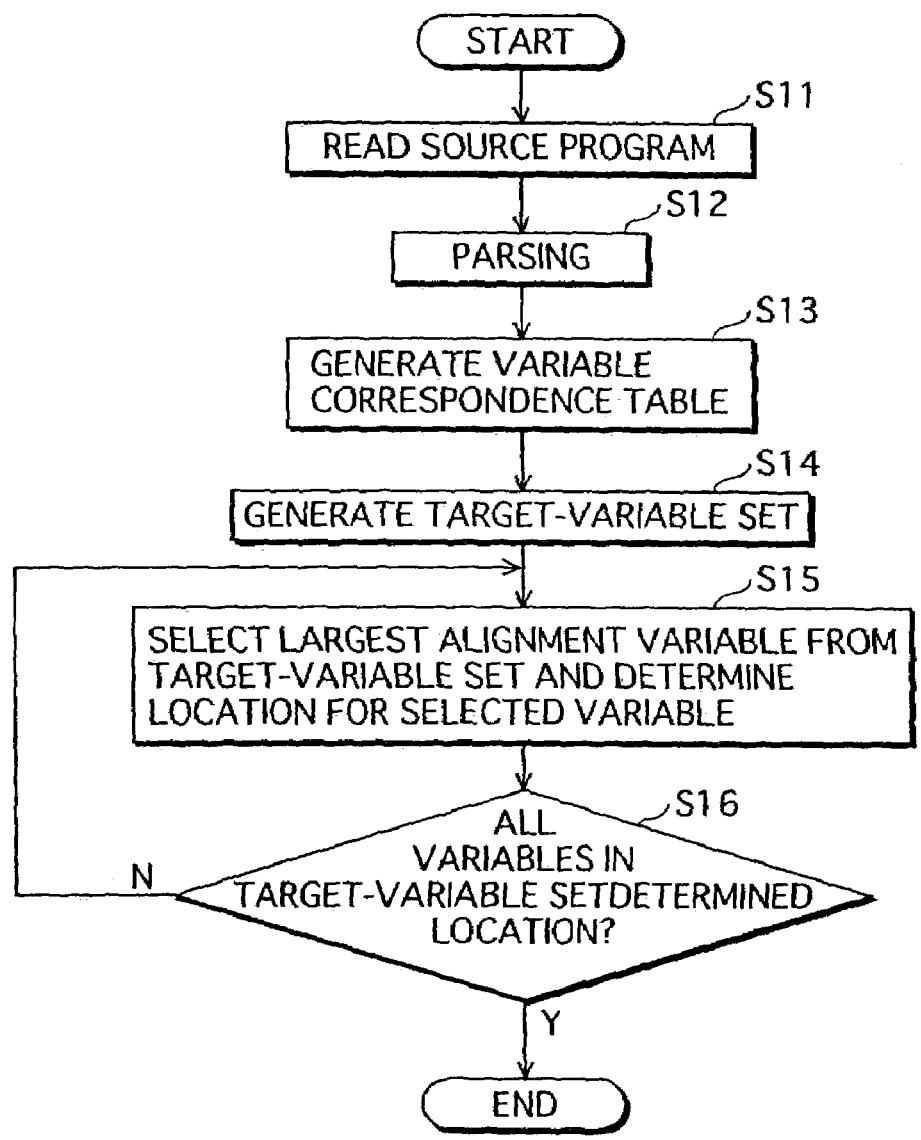
FIG. 14 is a flowchart showing location determination processing according to the conventional scheme 2 performed by a compiler to allocate the variables to a stack area.
Figure 15:
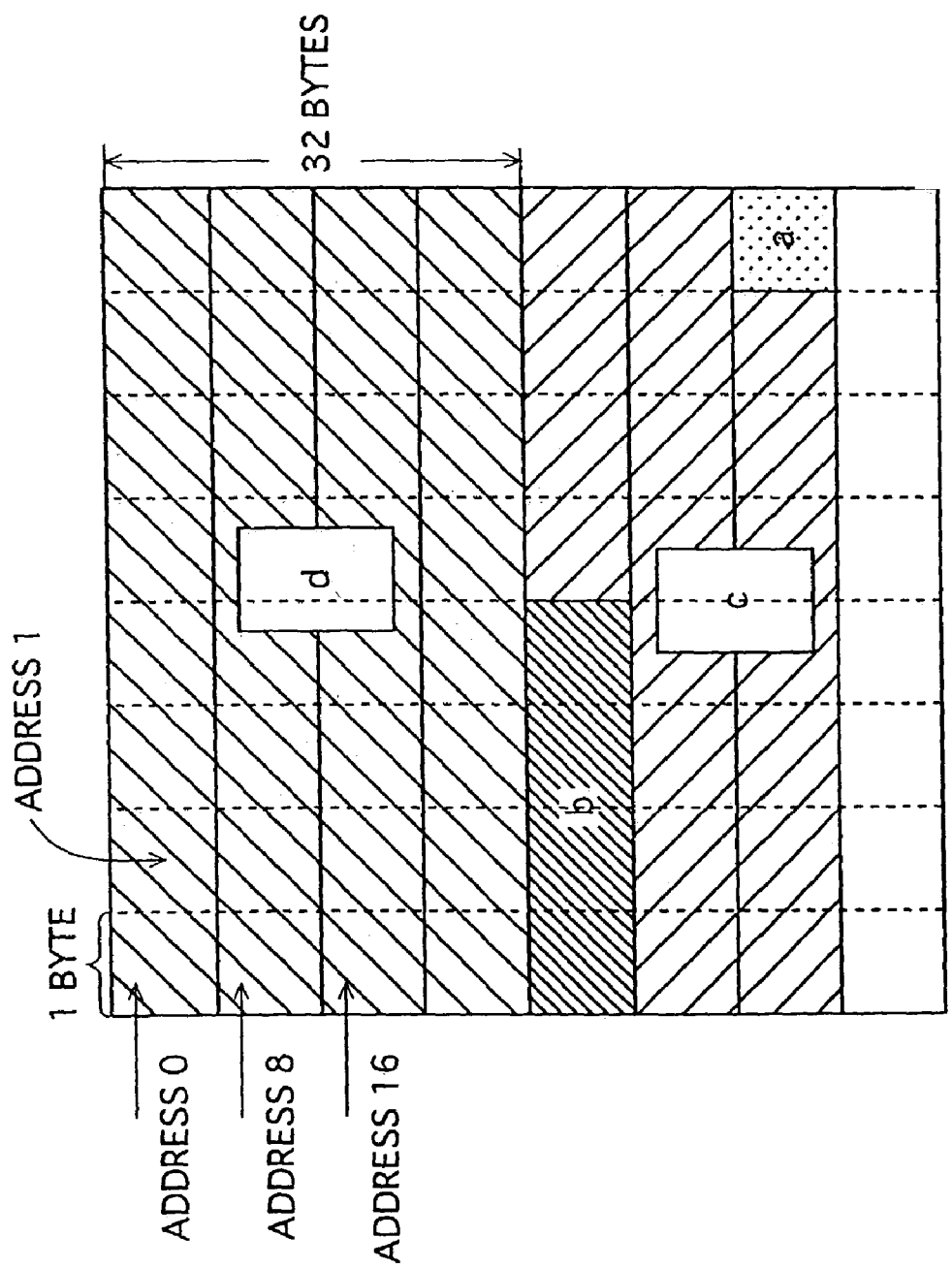
FIG. 15 is a schematic view showing the locations of the variables a, b, c and d in the stack area allocated according to the conventional scheme 2.

With the above operations, the variables a, b, c and d are determined to be allocated to the locations in the stack area as shown inaschematic diagram of FIG. 8. Suppose variables stored within the predetermined address range, i.e. a 32-byte range of the stack area are accessible with a single instruction, all the variables declared in the source program are accessible with a single instruction.

FIG. 9 is a view showing an example of an object program when the variables a, b, c and d are allocated according to the above location determination processing. In FIG. 9, the statement 210,is an instruction to store into a register r0, the variable a stored in the stack area at the address 23. Similarly, the statement 220 is an instruction to store into the register r0, the variable b stored in the stack area at the address 0. The statement 230 is an instruction to store into the register r0, the variable c stored in the stack area at the address 4. The statement 240 is an instruction to store into the register 0, the variable d stored in the stack area at the address 24.

FIGS. 10 and 11 show examples of an object program when the variables a, b, c and d are allocated according to the conventional schemes 1 and 2, respectively.

In the object program shown in FIG. 10, the variables a, b and c stored in the stack area at the addresses 0, 4 and 8 are fetched and stored into the register r0 each with single instructions 310–330. However, as in the instructions 340 and 350, two instructions are required to store into the register r0, the variable d stored in the stack area at the address 32. As a result, the size of overall instruction code is required to be larger.

Similarly, in the object program shown-in FIG. 11, the variable d stored in the stack area at the address 0 is fetched and stored into a register r0 with a single instruction 470. However, as in the instructions 410 and 420, 430 and 440, and 450 and 460, two instructions are required to store into the register r0, each of the variables a, b and c stored in the stack, area. Consequently, the size of overall instruction set is required to be larger.

As described above, the location determination processing according to the present embodiment is effective to reduce the number of instructions required to access variables stored in the stack area, and thus to reduce the size of a required instruction code.

<Supplemental Remarks>

Up to this point, a compiler apparatus according to the present invention has been described by way of the above embodiment. However, it is naturally appreciated the present invention is not limited to the specific embodiment described above, and following modifications may be made.

(1) In the embodiment above, the step S1005 shown in FIG. 3 is to select a variable from the target-variable set based on the alignment. However, the selection may be made based on other data attributes. In one alternative, the variable correspondence table may additionally include, as shown in FIG. 16, information regarding how frequently each variable is referenced, so the selection is sequentially made in the descending order of the reference frequencies. In another alternative, the selection may be made based on whether each variable in the stack area is accessible with an instruction with less constraint or with an instruction having a smaller code size.

In the step S1010 shown in FIG. 3, a variable to be excluded from the determined-variable set is specified based on the size. Similarly to the above modification, however, the specification may be made based on other data attributes. In one alternative, the variable correspondence table may additionally include, as shown in FIG. 16, information regarding how frequently each variable is referenced, so that the specification is sequentially made in the ascending order of the reference frequencies. The information regarding the reference frequencies may be generated based on the parsing result of the source program or the result of test execution of the source program by a simulator.

In another alternative, the specification may be made based on whether each variable in the stack area is accessible with an instruction with less constraint or with an instruction having a smaller code size.

(2) In the step S1014 shown in FIG. 3, a variable to be excluded from the exclusion-variable set is selected based on the size. Similarly to the above modification, however, the selection may be made based on other data attributes. In one alternative, the variable correspondence table may additionally include, as shown in FIG. 16, information regarding how frequently each variable is referenced, so that the selection is sequentially made in the ascending order of the reference frequencies.

In another alternative, the selection may be made based on whether each variable in the stack area is accessible with an instruction with less constraint or with an instruction having a smaller code size.

(3) In the location determination processing shown in FIG. 3, locations for storing the variables included in the exclusion-variable set are determined through the steps S1013–S1016. Alternatively, however, the steps S1005–S1012 may be repeatedly performed to determine the locations for the variables included in the exclusion-variable set in a manner that the variables are allocated in another predetermined address range of the stack area.

To be more specific, for example, the above steps are performed first on the variables included in the target-variable set to determine locations for the variable within a 32-byte address range of a stack area corresponding to the address 0–32. At this stage, some of the variable may not be determined to be allocated in the above range and thus remains in the exclusion-variable set. Next, the same steps are performed on the variables remaining in the exclusion-variable set so as to determine locations for the remaining variables within another 32-byte address range of the stack area corresponding to the address 32–36. The same steps are further performed on the variables included in the exclusion-variable set so as to determine locations for the variables in a yet another 32-byte address range of the stack area corresponding to the address 64–95. In this manner, the operations of the steps S1016–1016 may be repeatedly performed for a different address range of the stack area until locations are determined for all the variables.

Note that unlike the above example, the address range subjected to each sequence of location determination processing performed for the exclusion-variable set may not be equal in size. Instead, the stack area may be divided at the offset boundaries (which are determined depending on, for example, instruction size, latency, and combinations of instructions), and subjected to location determination processing in the ascending order of offset values.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A compiler apparatus for generating an instruction code composed of instruction sets each including an instruction that designates an address of a data item stored in a memory area, comprising:

an allocation data selecting unit operable to sequentially select a data item from a group X composed of a plurality of data items each having a plurality of data attributes, the selection being made based on a descending order of an alignment of each data item, the alignment being a value representing a strength of a constraint on an allocatable location of a corresponding data item in a memory area;

an allocation judging unit operable to judge, each time a data item is selected, whether the selected data item is allocatable within a predetermined address range from the starting address of the memory area, which corresponds to the address range being accessible with a single instruction; and an exclusion data specifying unit operable to specify, when the judgment is negative, a data item to be excluded from the group X out of all data items having been selected, the specification being made based on a descending order of a size of each data item, wherein the allocation data selecting unit repeats the selection from data items that remain in the group X after excluding all data items having been specified to be excluded, until all the remaining data items are judged to be allocatable to the memory area.

2. The compiler apparatus according to claim 1, further comprises a re-allocation data selecting unit operable to sequentially select, after the allocation data selecting unit completes the selection, a data item from the excluded data items, the selection by the re-allocation data selecting unit being made in an ascending order of a size of each data item, wherein the allocation judging unit further judges, each time a data item is selected by the re-allocation data selecting unit, the selected data item is allocatable to the memory area.

3. The compiler apparatus according to claim 1, wherein
the allocation data selecting unit further sequentially selects, after completing the selection, a data item from the excluded data items, the further-selection being made based on a descending order of an alignment of each data item, the alignment being a value representing a strength of a constraint on an allocatable location of a corresponding data item in a memory area,
the allocation judging unit further judges, each time a data item is further-selected, whether the further-selected data item is allocatable within a predetermined address range from the starting address of another memory area, which corresponds to the address range being accessible with a single instruction,
the exclusion data specifying unit further specifies, when the further judgment is negative, a data item to be re-excluded from the excluded data items out of all data items having been further-selected, the further specification being made based on a descending order of a size of each data item, and
the allocation data selecting unit repeats the further-selection from data items that remain after excluding all data items having been further specified to be re-excluded, until all the remaining data items are judged to be allocatable to said another memory area, and
when there are any re-excluded data items after completing the further-selection,
the allocation data selecting unit further selects a data item sequentially from the re-excluded data items,
the allocation judging unit further judges, each time a data item is further selected from the re-excluded data items, whether the further-selected data item is allocatable within a predetermined address range from the starting address of a yet another memory area, which corresponds to the address range being accessible with a single instruction, and
the exclusion data specifying unit further specifies a data item when the further judgment is negative.

4. The compiler apparatus according to claim 1, wherein
the allocation data selecting unit further sequentially selects, after completing the selection, a data item from the excluded data items, the further selection being made based on a descending order of an alignment of each data item, the alignment being a value representing a strength of a constraint on an allocatable location of a corresponding data item in a memory area,
the allocation judging unit further judges, each time a data item is further selected, whether the further selected data item is allocatable within a predetermined address range from the starting address of another memory area, which corresponds to the address range being accessible with a single instruction,
the exclusion data specifying unit further specifies, when the further judgment is negative, a data item to be re-excluded from the excluded data items out of all data items having been further selected, the further specification being made based on an ascending order of a reference frequency of each data item, the reference frequency representing how frequently a corresponding data item is referenced,
the allocation data selecting unit repeats the further-selection from data items that remain after excluding all data items having been further specified to be re-excluded, until all the remaining data items are judged to be allocatable to said another memory area, and
when there are any re-excluded data items after completing the further selection,
the allocation data selecting unit further selects a data item sequentially from the re-excluded data items,
the allocation judging unit further judges, each time a data item is further selected from the re-excluded data items, whether the further-selected data item is allocatable within a predetermined address range from the starting address of a yet another memory area, which corresponds to the address range being accessible with a single instruction, and
the exclusion data specifying unit further specifies a data item when the further judgment is negative.

5. A compiler apparatus for generating an instruction code composed of instruction sets each including an instruction that designates an address of a data item stored in a memory area, comprising:
an allocation data selecting unit operable to sequentially select a data item from a group X composed of a plurality of data items each having a plurality of data attributes, the selection being made based on a descending order of an alignment of each data item, the alignment being a value representing a strength of a constraint on an allocatable location of a corresponding data item in a memory area;
an allocation judging unit operable to judge, each time a data item is selected, whether the selected data item is allocatable within a predetermined address range from the starting address of the memory area, which corresponds to the address range being accessible with a single instruction; and
an exclusion data specifying unit operable to specify, when the judgment is negative, a data item to be excluded from the group X out of all data items having been selected, the specification being made based on an ascending order of a reference frequency of each data item, the reference frequency representing how frequently a corresponding data item is referenced, wherein
the allocation data selecting unit repeats the selection from data items that remain in the group X after excluding all data items having been specified to be excluded, until all the remaining data items are judged to be allocatable to the memory area.

6. The compiler apparatus according to claim 5, further comprising
a re-allocation data selecting unit operable to sequentially select, after the allocation data selecting unit completes the selection, a data item from the excluded data items, the selection by the re-allocation data selecting unit being made in a descending order of a reference frequency of each data item, wherein
the allocation judging unit further judges, each time a data item is selected by the re-allocation data selecting unit, whether the selected data item is allocatable within a predetermined address range from the starting address of the memory area, which corresponds to the address range being accessible with a single instruction.

7. A machine-implemented data location determining method for a compiler apparatus to generate an instruction code composed of instruction sets each including an instruction that designates an address of a data item in a memory area, the method comprising:
an allocation data selecting step of sequentially selecting a data item from a group X composed of a plurality of data items each having a plurality of data attributes, the selection being made based on a descending order of an alignment of each data item, the alignment being a value representing a strength of a constraint on an allocatable location of a corresponding data item in a memory area;

an allocation judging step of judging, each time a data item is selected, whether the selected data item is allocatable within a predetermined address range from the starting address of the memory area, which corresponds to the address range being accessible with a single instruction; and an exclusion data specifying step of specifying, when the judgment is negative, a data item to be excluded from the group X out of all data items having been selected, the specification being made based on a descending order of a size of each data item, wherein the allocation data selecting step repeats the selection from data items that remain in the group X after excluding all data items having been specified to be excluded, until all the remaining data items are judged to be allocatable to the memory area.

8. The machine-implemented data location determining method according to claim 7, wherein the allocation data selecting step further sequentially selects, after completing the selection, a data item from the excluded data items, the further-selection being made based on a descending order of an alignment of each data item, the alignment being a value representing a strength of a constraint on an allocatable location of a corresponding data item in a memory area, the allocation judging step further judges, each time a data item is further-selected, whether the further-selected data item is allocatable within a predetermined address range from the starting address of another memory area, which corresponds to the address range being accessible with a single instruction, the exclusion data specifying step further specifies, when the further judgment is negative, a data item to be re-excluded from the excluded data items out of all data items having been further-selected, the further specification being made based on a descending order of a size of each data item, the allocation data selecting step repeats the further-selection from data items that remain after excluding all data items having been further specified to be re-excluded, until all the remaining data items are judged to be allocatable to said another memory area, and when there are any re-excluded data items after completing the further-selection, the allocation data selecting step further selects a data item sequentially from the re-excluded data items, the allocation judging step further judges, each time a data item is further selected from the re-excluded data items, whether the further-selected data item is allocatable within a predetermined address range from the starting address of a yet another memory area, which corresponds to the address range being accessible with a single instruction, and the exclusion data specifying step further specifies a data item when the further judgment is negative.

9. The machine-implemented data location determining method according to claim 7, wherein the allocation data selecting step further sequentially selects, after completing the selection, a data item from the excluded data items, the further selection being made based on a descending order of an alignment of each data item, the alignment being a value representing a strength of a constraint on an allocatable location of a corresponding data item in a memory area, the allocation judging step further judges, each time a data item is further-selected, whether the further-selected data item is allocatable within a predetermined address range from the starting address of another memory area, which corresponds to the address range being accessible with a single instruction.

the exclusion data specifying step further specifies, when the further judgment is negative, a data item to be re-excluded from the excluded data items out of all data items having been further-selected, the further specification being made based on an ascending order of a reference frequency of each data item, the reference frequency representing how frequently a corresponding data item is referenced, the allocation data selecting step repeats the further selection from data items that remain after excluding all data items having been further specified to be re-excluded, until all the remaining data items are judged to be allocatable to said another memory area, and when there are any re-excluded data items after completing the further-selection, the allocation data selecting step further selects a data item sequentially from the re-excluded data items, the allocation judging step further judges, each time a data item is further selected from the re-excluded data items, whether the further-selected data item is allocatable within a predetermined address range from the starting address of a yet another memory area, which corresponds to the address range being accessible with a single instruction, and the exclusion data specifying step further specifies a data item when the further judgment is negative.

10. A machine-implemented data location determining method for a compiler apparatus to generate an instruction code composed of instruction sets each including an instruction that designates an address of a data item stored in a memory area, the method comprising:

an allocation data selecting step of sequentially selecting a data item from a group X composed of a plurality of data items each having a plurality of data attributes, the selection being made based on a descending order of an alignment of each data item, the alignment being a value representing a strength of a constraint on an allocatable location of a corresponding data item in a memory area;

an allocation judging step of judging, each time a data item is selected, whether the selected data item is allocatable within a predetermined address range from the starting address of the memory area, which corresponds to the address range being accessible with a single instruction; and an exclusion data specifying step of specifying, when the judgment is negative, a data item to be excluded from the group X out of all data items having been selected, the specification being made based on an ascending order of a reference frequency of each data item, the reference frequency representing how frequently a corresponding data item is referenced, wherein the allocation data selecting step repeats the selection from data items that remain in the group X after excluding all data items having been specified to be excluded, until all the remaining data items are judged to be allocatable to the memory area.

* * * * *